United States Patent [19]

Ebisawa et al.

[11] Patent Number: 4,724,057
[45] Date of Patent: Feb. 9, 1988

[54] PROCESS OF PRETREATMENT PRIOR TO PAINT COATING

[75] Inventors: Hiroo Ebisawa, Iruma; Hiroyoshi Nozaki, Sayama; Hirofumi Hara, Hino; Masaru Abe; Katsumi Sekiguchi, both of Yokohama, all of Japan

[73] Assignees: Honda Giken Kogyo Kabushiki Kaisha; Mitsui Toatsu Chemicals Inc., both of Tokyo, Japan

[21] Appl. No.: 844,041

[22] Filed: Mar. 25, 1986

[30] Foreign Application Priority Data

Mar. 26, 1985 [JP] Japan .................................. 60-61394

[51] Int. Cl.$^4$ ........................... C07C 3/24; B05D 3/06
[52] U.S. Cl. .................................... 204/169; 204/170; 427/40; 427/307
[58] Field of Search .................. 427/40, 307, 407.1; 204/165, 168, 169, 170

[56] References Cited

U.S. PATENT DOCUMENTS

| | | | |
|---|---|---|---|
| 3,661,735 | 5/1972 | Drelich ................... | 204/165 |
| 3,740,325 | 6/1973 | Manion et al. ............ | 204/168 X |
| 4,188,426 | 2/1980 | Averbach .................. | 204/169 X |
| 4,366,208 | 12/1982 | Akai et al. ............... | 204/169 X |
| 4,396,641 | 8/1983 | Imada et al. ............. | 427/41 |
| 4,465,715 | 8/1984 | Manabe et al. ........... | 427/444 |
| 4,468,412 | 8/1984 | Fujii et al. .............. | 427/40 X |

FOREIGN PATENT DOCUMENTS

55-165925 12/1980 Japan ................................ 427/40

*Primary Examiner*—Thurman K. Page
*Attorney, Agent, or Firm*—Armstrong, Nikaido, Marmelstein & Kubovcik

[57] ABSTRACT

The surface of a product molded of polyolefin is washed with a fluorine-containing organic solvent such as $CCl_2F\text{—}CCl_2F$ or $CCl_2F\text{—}CClF_2$ and, thereafter, the product surface is treated with a plasma. Since the product surface is washed with an organic solvent containing fluorine, wastewater and process operation can be controlled with relative ease. A painted product pretreated by the process of the invention has a high peel strength and water resistance.

7 Claims, No Drawings

PROCESS OF PRETREATMENT PRIOR TO PAINT COATING

BACKGROUND OF THE INVENTION

The present invention relates to a process of pretreating an object prior to painting, and more particularly to a process of pretreating an object made of polyolefin such as polyethylene (PE) or polypropylene (PP) before it is coated with paint.

Polyolefin is widely used to make various products since it is lightweight, highly resistant to chemicals, and excellent in mechanical strength. Examples of such polyolefin products are automobile parts such as interior and exterior decorative members, bodies, and bumpers. Objects made of polyolefin are highly advantageous since various complex shapes of integral structure can be produced efficiently by a suitable molding process such as injection molding.

Although polyolefin articles are excellent in many respects, they have found only partial use as components that are required to be painted, such as automobile bodies and interior and exterior decorative parts, because a paint film coated directly on a polyolefin member for better appearance is poor in peel strength.

One process which has been proposed to improve the adhesion of a paint film to a polyolefin product is disclosed in U.S. Pat. No. 4,465,715. According to the disclosed pretreatment process, the surface of a polyolefin product prior to being coated with paint is washed with a chlorine-based or aromatic-group organic solvent having a solubility parameter (SP value) equal or similar to that of the polyolefin. Such solvents include trichloroethane, dichloroethylene, benzene, toluene, and the like. Plasma treating is thereafter performed on the surface of the product.

By treating the surface of a polyolefin product with an organic solvent having an SP value equal to or similar to that of the polyolefin, oil and polymers of lower grade can be removed from the surface of the product, and the surface can be swollen or made rough to increase its effective surface area. The plasma treating effected on the product treated with the solvent greatly increases the activation of the surface based on the production of a hydrophilic group. As an example described in the patent, polypropylene having an SP value ranging from 9.2 to 9.4 is used as the polyolefin, and trichloroethane having an SP value of 9.6 is used as the organic solvent.

The pretreatment process performed under the foregoing conditions has, however, failed to achieve the desired adhesion strength of the paint film.

This result appears to have been obtained for the following reasons:

Treating the surface of a polyolefin product with an organic solvent, as referred to above, having an SP value similar to that of polyolefin results in swelling and roughening of the product surface, and subsequent plasma treating should improve the surface activating effect. However, the surface layer of the product is rendered brittle due to the swelling thereof. Although the coating film firmly attaches to the swollen surface, the peel strength of the coating film is lowered. In the event that a chlorine-based organic solvent is used, there are certain handling problems particularly in wastewater treatment and process operation control.

SUMMARY OF THE INVENTION

It is an object, therefore, of the present invention to provide a process for pretreating a polyolefin product prior to painting and, more particularly, to provide a pretreating process which includes a plasma treating step for increasing the peel strength and water resistance of a paint film to be coated on the surface of the polyolefin product.

Another object of the present invention is to provide a process for pretreating a polyolefin product, or object, prior to painting, the process allowing wastewater treatment and process operation to be controlled relatively easily in the step of washing the polyolefin product.

According to the present invention, there is provided a process for pretreating a polyolefin product prior to applying a paint coating to the product, comprising the steps of washing the surface of the polyolefin product with an organic solvent containing fluorine, and thereafter performing a plasma treatment on the surface of the polyolefin product.

The above and other objects, features and advantages of the present invention will become more apparent from the following description of the process according to the present invention.

DETAILED DESCRIPTION OF PREFERRED EMBODIMENTS

The description of the materials and methods used in the invention of prior U.S. Pat. No. 4,465,715 is hereby incorporated by reference.

Examples of polyolefins which can be treated according to the process of the present invention include polyethylene, polypropylene, ethylene vinylacetate copolymer, ethylene acrylate copolymer, ethylene propylene copolymer, mixtures of these polyolefins, and a mixture of one or more of these polyolefins with a thermoplastic elastomer, inorganic filler, or glass fiber.

The polyolefin or polyolefin mixture is mixed with an antioxidant and a thermal stabilizer, and the resultant mixture is pelletized. The pellets are then molded by, for example, an extrusion molding process to manufacture a molded product.

The surface of the molded product is washed by contacting the surface with an organic solvent containing fluorine and which is in a liquid or a gaseous state. Examples of the organic solvent containing fluorine are $CCl_2F-CCl_2F$, $CCl_2F-CClF_2$, and the like. These organic solvents may be used separately or as a mixture and may be diluted with a solvent such as ethanol, acetone, methylene chloride, trichloroethane. In the event that the fluorine-containing organic solvent is diluted, it should preferably comprise 50 weight % or more of the mixture. The molded product is washed at room temperature if the solvent is in the liquid state. If the solvent is in the gaseous state, the temperature at which the molded product is washed should be selected so as to maintain the vapor pressure of the solvent normally in the range of from 0.1 to 2 $kg/cm^2$ depending on the boiling point of the solvent used. The molded product is typically washed for a time period ranging from 10 to 300 seconds.

After the molded product has been washed with the organic solvent containing fluorine, the surface of the molded product is subjected to a plasma treatment.

The atmospheric gas useful in the plasma treatment includes air, hydrogen, helium, nitrogen, oxygen, compounds containing fluorine, carbon monoxide, carbon dioxide, argon, and mixtures of these. However, a gas composed primarily of oxygen is preferred from the standpoint of treatment efficiency.

Plasma treating conditions vary depending on the type of plasma treatment used, the configuration of the product to be treated, and other factors as will be understood by those skilled in the art. Where oxygen is employed as the plasma treating gas, the plasma treatment is normally performed under a vacuum in the range of from 0.3 to 5.0 Torr at a frequency of $2,450 \pm 10$ MHz and for a period of time ranging from 5 to 300 seconds.

In a typical embodiment of the plasma treatment, a product molded of resin is washed with the fluorine-containing organic solvent and set in a plasma treatment chamber. The chamber is then filled with atmospheric gas as referred to above, and thereafter a plasma is produced in the chamber to effect plasma treatment on the surface of the molded product.

The molded product thus obtained is then coated with a urethane paint, for example, using an ordinary paint coating method which can provide a coating of paint of a suitable thickness. The final painted product may be used, for example, as an automobile interior or exterior decorative component, body, bumper or the like.

EXAMPLES

Products prepared according to the process of the present invention and according to a conventional process were tested for peel strength and resistance to hot water. The results are set forth in the Table below.

The polyolefin products employed in the inventive and comparative processes were flat plates (having a size of $80 \times 160 \times 2$ mm) extrusion-molded from a resin compound comprising ethylene-propylene block copolymer (containing 8 weight % of ethylene), high-density polyethylene (HDPE), low-density polyethylene (LDPE), ethylene propylene rubber (EPR), and talc.

Plasma treatment was performed under the following conditions:

Washing conditions

In Examples 1 through 7, the product was washed with a vapor of $CCl_2F-CClF_2$ (having a vapor pressure of 1.0 kg/cm$_2$) for 60 seconds. In Examples 8 and 9, the product was washed by being immersed in $CCl_2F-CClF_2$/acetone (at a weight ratio of 70/30) or $CCl_2F-CClF_2$ for 60 seconds at 25° C. In Comparative Example 1, the product was washed with a vapor of 1,1,1-trichloroethane (having a vapor pressure of 1.0 kg/cm$_2$) for 60 seconds.

Plasma treatment conditions (1) Plasma treatment apparatus used: Microwave plasma treatment apparatus manufactured by Toshiba Corp. (Type TMZ-2026M)
(2) Treatment gas: oxygen
(3) Treatment time: 30 seconds
(4) Gas pressure: 1.0 Torr
(5) Gas flow rate: 480 cc/min.
(6) Microwave output: 1,500 W

Paint coating conditions (1) Paint used: Two-pack polyester-polyurethane paint manufactured by Nippon Bee Chemical Co., Ltd.
(2) Baking time: 80° C. × 30 minutes
(3) Coated-film thickness: 50

The peel strength was measured by making a cut in the coated films for a width of 1 cm and testing the coated films on the Instron type tensile machine at a tensile rate of 30 mm/min. The coated films were measured for resistance to hot water by immersing them in water of 40° C. for 240 hours and testing them in a check pattern.

TABLE

| | Inventive Example | | | | | | | | | Comparative Example | | |
|---|---|---|---|---|---|---|---|---|---|---|---|---|
| | 1 | 2 | 3 | 4 | 5 | 6 | 7 | 8 | 9 | 1 | 2 | 3 |
| Composition wt % | | | | | | | | | | | | |
| PEP #1 | 100 | 70 | 90 | 70 | 65 | 65 | | 100 | 100 | 100 | 70 | 70 |
| HDPE #2 | | | | | 5 | | 100 | | | | | |
| LDPE #3 | | | | | | 5 | | | | | | |
| EPR | | 30 | | 25 | 25 | 25 | | | | | 25 | 25 |
| Talc | | | 10 | 5 | 5 | 5 | | | | | 5 | 5 |
| Treated with | | | | | | | | | | | | |
| Washed by solvent | | | | | | | | | | | | |
| Vapor | | | | | | | | | | | | |
| $CCl_2F-CCl_2F$ | * | * | * | * | * | * | * | | | | Unused | * |
| 1,1,1-Trichloroethane | | | | | | | | | | * | | |
| Liquid | | | | | | | | | | | | |
| $CCl_2F-CCl_2F$/acetone (wt ratio = 70/30) | | | | | | | | * | | | | |
| $CCl_2F-CClF_2$ | | | | | | | | | * | | | |
| Plasma | * | * | * | * | * | * | * | * | * | * | * | Not used |
| Coating results | | | | | | | | | | | | |
| Peel strength (kg/cm) | 0.85 | 0.95 | 0.93 | 1.08 | 1.07 | 1.07 | 0.81 | 0.83 | 0.85 | 0.62 | Partly peeled | Fully peeled |
| Resistance to hot water: peel count (1/100) | 0 | 0 | 0 | 0 | 0 | 0 | 0 | 0 | 0 | 0 | 30 | 100 |

*: Used or Effected
1: Polyethylenepropylene block copolymer
2: High-density polyethylene
3: Low-density polyethylene As is apparent from the Table, the paint films coated on the product surfaces pretreated using the process of the present invention have much better peel strength and resistance to hot water than paint films on the product surfaces pretreated using a conventional process.

According to the pretreatment process of the present invention, as described above, the surface of a polyolefin product is treated with a fluorine-containing, or fluorinated, organic solvent. Using this solvent, the surface of the polyolefin product is washed to remove oil therefrom without being substantially swollen or roughened. As a result, the product surface is not excessively etched by the plasma treatment, and hence the subsequently coated paint film will have greater peeling strength than possible with the conventional pretreatment process.

The use of the fluorine-containing organic solvent is also advantageous in that wastewater and process operation can be more easily controlled than when a chlorine-based solvent such as trichloroethane is used.

Although there has been described what is at present considered to be the preferred embodiment of the present invention, it will be understood that the invention may be embodied in other specific forms without departing from the spirit or essential characteristics thereof. The present embodiment is therefor to be considered in all aspects as illustrative, and not restrictive. The scope of the invention is indicated by the appended claims rather than by the foregoing description.

We claim:

1. A process of pretreating a polyolefin product prior to coating the object with paint, comprising the steps of:
    washing the surface of a product made of a polyolefin with a fluorine-containing organic solvent which is diluted with another organic solvent, and
    thereafter plasma treating the surface of the polyolefin product.

2. A process according to claim 1, wherein said fluorine-containing organic solvent is selected from the group consisting of $CCl_2F-CCl_2F$ and $CCl_2F-CClF_2$.

3. A process according to claim 1, wherein said fluorine-containing organic solvent is diluted with another organic solvent.

4. A process according to claim 1, wherein said fluorine-containing organic solvent is in a gaseous state.

5. A process according to claim 1, wherein said fluorine-containing organic solvent is in a liquid state.

6. A process according to claim 1, wherein said plasma treatment is effected in a gas selected from the group consisting of air, hydrogen, helium, nitrogen, oxygen, a compound containing fluorine, carbon monoxide, carbon dioxide, and a mixture thereof.

7. A process according to claim 6, wherein said gas comprises a gas composed primarily of oxygen.